3,463,950
MOTOR VIBRATION ISOLATING ARRANGEMENT
Fritz Schädlich, Echterdingen, Germany, assignor to
Robert Bosch GmbH, Stuttgart, Germany
Filed Nov. 2, 1966, Ser. No. 591,576
Claims priority, application Germany, Nov. 9, 1965
B 84,420
Int. Cl. H02k 5/24
U.S. Cl. 310—51                                    14 Claims

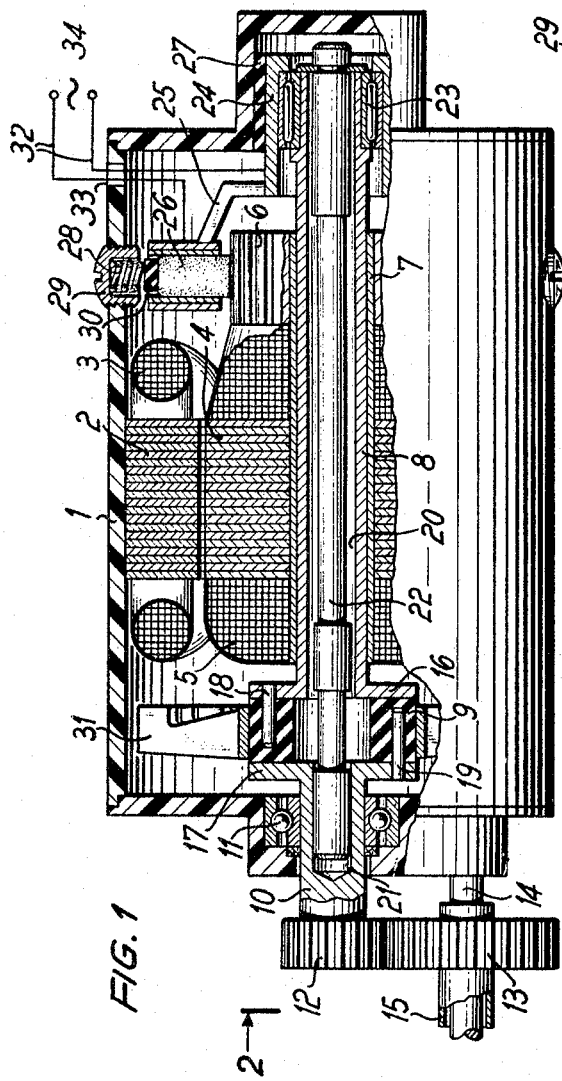
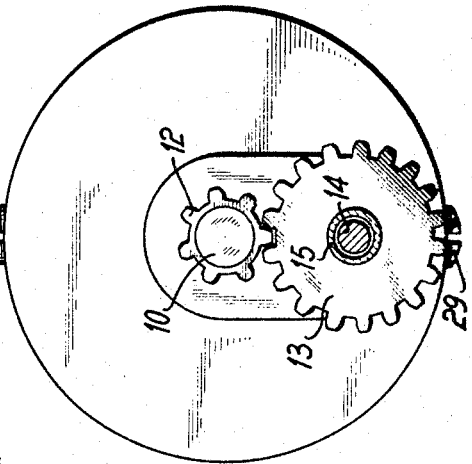
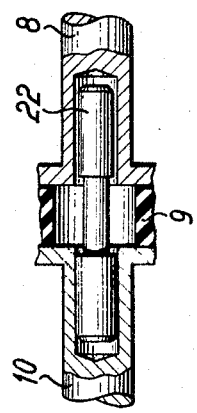
FIG. 1
FIG. 2
FIG. 3
INVENTOR
Fritz Schädlich
by Michael S. Striker
Attorney

United States Patent Office 3,463,950
Patented Aug. 26, 1969

ABSTRACT OF THE DISCLOSURE

An arrangement for isolating vibrations of a motor. A source of alternating current drives a commutator motor which, in turn, rotates a mechanical load. A resilient power transmission member is secured between the rotating shaft of the motor and the load. The elasticity of a resilient power transmission member is such that it can absorb mechanical vibrations having a frequency at least twice that of the source of alternating current.

---

The present invention relates to an AC driven motor having a commutator and rotor mechanically connected to the driven load by a coupling linkage.

An AC driven commutator motor applies continuously an impulse to its rotor, as a result of the action of the motor magnetic field. These impulses or accelerations of the rotor are reflected as a pulsating torque thereof. The impulses do not provide disturbing effects when the driven load is firmly secured to the rotor shaft. This arises from the fact that the inertia of the rotating masses serve to smooth out the effects of the pulsating torque. If, on the other hand, it is essential that a gear drive be situated between the rotor shaft and the load, the gear members will be subjected to the effects of the impulses. For example, when the rotor accelerates due to the rise of the associated magnetic field, the driving gear or pinion will apply an impulse or shock to the driven gear connected to the load. When, susequently, the rotor decelerates due to the decline of the magnetic field, the driven gear will apply an impulse or shock to the pinion. These impulses and sohcks do not only tend to damage the transmission gears and members; they also produce considerable noise effects which act, in a disturbing manner, upon persons and users of manual power tools as, for example polishing machines.

Accordingly an object of the present invention is to provide a motor arangement whereby the pulsating torque applied to the rotor of the motor is substantially smoothed out and prevented from being transmitted to the motor output linkages leading to the driven load.

Another object of the present invention is to provide a motor arrangement, as set forth, wherein the rotor is isolated, from the vibrational point of view, from the housing of the motor.

A further object of the present invention is to provide a motor arrangement, of the character described, which is of simple design, has a minimum number of parts, and is reliable in operation.

A still further object of the present invention is to provide a motor arrangement, as described, wherein the parts serving to isolate virbrationally the rotor from the motor housing, are readily accessible for maintenance purposes.

A yet further object of the present invention is to provide a motor arrangement, as set forth, which may be economically manufactured and readily assembled.

With the preceding objects in view, the present invention provides for an elastic member within the coupling between the rotor and the driven load. This elastic member is selected of material so that it is capable of absorbing mechanical vibrations having a frequency equal to at least twice the frequency of the current supplied to the motor. This design of the present invention, is in contrast to the prior art wherein the rotor shaft is hollow and a torsional rod is mounted within the hollow space or bore. This torsional rod serves as a damping member flexibly connecting the rotor with the driven load. With this arrangement of the prior art, it was intended that sudden decelerations of the load give rise to a conversion of the kinetic energy of the rotor into potential energy stored by the torsion rod. The damping characteristics of the torsional rod were to inhibit repeated oscillations that would ordinarily result from such action. This arrangement heretofore, has not, however, been satisfactory because it is too stiff and inflexible. This arrangement, of the prior art, is moreover, not adaptable to smooth out the pulsations in the driving torque of the rotor. In contrast to the prior art, the present invention is especially adaptable to miniature equipment as applied to, for example, portable hand tools. The commonly known arrangement is suitable only, on the other hand, to heavier types of motors.

The novel features which are considered as characteristic of the invention, are set forth in particular in the appended claims. The invention itself, however, both as to its additional objects and advantages thereof, will be best understood from the following description of specific embodiments when read in connection with the accompanying drawings in which:

FIG. 1 is an elevational cross-sectional view of the motor arrangement, with parts broken away, and shows the manner in which the rotor is coupled to the load through transmission gears;

FIG. 2 is an end view taken along line 2—2 in FIG. 1, and shows the arrangement of the transmission gears and the output members of the motor; and FIG. 3 is a partial cross-sectional view of FIG. 1, and shows another embodiment for guiding and aligning the parts of the rotor shaft.

Referring to the drawing, the AC (alternating current) driven motor includes a housing 1 made of insulating material. A stator constructed of laminations 2 and coil 3 is secured to the inner wall of the housing 1. Cooperating with the stator, is a rotor comprising laminations 4, coil 5 and commutator 6. The rotor is mounted upon a hollow shaft 8, by way of a sleeve 7. The latter is made of insulating material and isolates the rotor from the shaft. The hollow shaft 8 is coupled to a shaft end 10 through a flexible member 9. The shaft end 10 is held by a ball bearing 11 within the housing 1, and carries a pinion 12. The pinion 12 meshes with a gear 13 mounted upon a fixed shaft or pin 14 secured to the housing 1. The gear 13 may be coupled to a load, by way of its hollow shaft 15, or by further gearing. The load to be driven by the motor may be any appropriate one as, for example, a polishing disc.

The flexible coupling member 9 connecting the hollow shaft 8 with the shaft end 10, is capable of absorbing mechanical vibrations having frequencies equal to at least twice the frequency of the alternating current supplied to the motor. Thus, if the motor is to be energized with current having the usual frequency of 50 cycles per second, the coupling member 9 must be constructed of material capable of absorbing mechanical vibrations having a frequency of at least 100 cycles per second. In this manner, assurance is had that the pulsating torque applied to the rotor as a result of the rise and fall of the associated magnetic field, is not transmitted to the shaft end 10, and hence to the transmission members 12 and 13. The coupling member 9 is preferably made of rubber, from the viewpoint of economy and absorbability. Other materials, used for power transmission, may also be utilized for this purpose. However, these materials, for constructing the member 9 should be capable of transmitting the torque from the rotor without becoming destroyed as a result of the stress.

A simple manner of fastening of the coupling member 9 is realized by providing the shaft 8 and shaft end 10 with flanges 16 and 17 respectively. Pins 18 and 19 alternately secured to these flanges, penetrate the member 9 and thus secure the assembly. In order to insert and remove readily the member 9, the latter is located within an adequate amount of space between the rotor and the output driving linkage, and in a plane perpendicular to the rotor.

A precise retention and guidance of the shaft members 8 and 10, is achieved, in accordance with the present invention, through the concentric bores 20 and 21 within the shaft members, respectively. A coupling bolt member 22 resides in both of these bores, in a manner, whereby it is firmly secured within the bore 21 and is freely rotatable within the bore 20. As a result of this design, the coupling bolt member 22 may extend throughout the entire length of the hollow shaft 8. However, if desired, the bolt member 22 may extend only into the neighboring region of the shaft 8, as illustrated in FIG. 3. In this case, the portion of the shaft, not penetrated by the bolt member 22, may be of solid construction.

Due to the condition that the bolting member 22 serves only to guide and align the shaft members 8 and 10, it is not required to sustain any significant load or forces applied to it. Accordingly, the member 22 has no severe structural requirements. In accordance with the present invention, therefore, the bolt member 22 is made of insulating type of material as, for example, fiber glass. When the housing 1, coupling member 9, and bolt member 22 are made of insulating type of material, the assembly has the advantage that, in the event that the motor becomes faulty, no electrical voltages which may be contacted, lead to the exterior of the construction.

The other end of the shaft 8 is preferably supported by a needle bearing 23 mounted within a sleeve 24. Two diametrically oppositely-located brackets 25 are secured to the sleeve 24. The latter is retained within the housing 1 through the elastic bushing 27. The brackets 25 support the commutator brushes 26 which are isolated therefrom, and are provided with conductor leads or cables 32 passing through an opening 33 within the motor housing 1. The cables 32 are, in turn, connected to the alternating power supply 34. Since the commutator brushes 26 and their supporting member 25 differ from each other only in the respect that they are situated diametrically opposite, only one such assembly is shown in the partially broken-away view of FIG. 1.

The elastic bushing 27 located between the housing 1 and the sleeve 24, prevents the vibration, arising from the pulsating torque, to be transmitted to the output driving members 12 and 13, as a result of bypassing the coupling member 9 and associated shaft end 10. In this connection, it is also essetnial to isolate the brush spring 28 from the commutator brush 26. Thus, the brush 26 is maintained in continuous electrical contact with the commutator 6, by the spring 28. The latter, on the other hand, is held and supported within a terminal screw 29 threadably received by the housing 1. To prevent the aforementioned mechanical vibration from being transmitted to the housing 1, by way of the path including the brush 26 and the spring 29, it is essential that an isolating member 30 be inserted therebetween. The vibrations emitted by the commutator body are, therefore, inhibited from reaching the body 1 of the motor.

The elastic bushing 27 and the interposed isolation member 30 function, furthermore, to prevent any relative motion of the commutator brushes 26. In this manner, any vibrations or noise effects resulting from such relative movement, are also inhibited. In this connection, however, the bushing 27 and isolation member 30 must be made of material having the same elasticity as the coupling member 9, in order to provide effective results.

In the event that a cooling member 31 is to be included within the motor assembly, it is also preferably that such a cooling member be mounted so that it is vibrationally isolated. This is due to the condition that the rotational component 31 tends to suport the pulsating torque of the rotor when the magnetic field, associated therewith, declines. A simplified arrangement, for supporting the rotational component 31 in accordance with these requirements, is realized when the elastic coupling member 9 is, itself, utilized for such mounting purpose. In the exemplary construction shown by the drawing, the cooling component 31 is secured to the elastic member 9, as a result of press fitting the hub of the component 31 to the exterior surface of the member 9.

While the invention has been illustrated and described and embodied in vibration isolators for electric motors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A drive arrangement comprising, in combination, a source of alternating current having a predetermined frequency; a commutator motor connected to said source of alternating current so as to be driven thereby; a rotatable rotor shaft forming part of said commutator motor and driven by the same; drive means; resilient power transmission means connected, on the one hand, to said rotatable rotor shaft and, on the other hand, to said drive means, and adapted to absorb mechanical vibrations of said rotatable rotor shaft due to the magnetic action of said motor, the elasticity of said resilient power transmission means being such that it can absorb mechanical vibrations of at least twice the frequency of said source of alternating current.

2. A drive arrangement of defined in claim 1 wherein said rotor shaft comprises two separate rotatable members coupled together by said resilient power transmission means.

3. A drive arrangement as defined in claim 2 wherein said resilient power transmissin means is situated between the diametrical cross sections of said separate rotor members.

4. A drive arrangement as defined in claim 3 including a flange secured to each of said separate rotor members and in contact with said resilient power transmission means for securing the latter to said separate rotor members.

5. A drive arrangement as defined in claim 1 wherein said resilient power transmission means is a rubber compound.

6. A drive arrangement comprising, in combination, a source of alternating current having a predetermined frequency; a communtator motor connected to said source of alternating current so as to be driven thereby; a rotatable rotor shaft forming part of said commutator motor and driven by the same; drive means; resilient power transmission means connected, on the one hand, to said rotatable rotor shaft and, on the other hand, to said drive means, and adapted to absorb mechanical vibrations of said rotatable rotor shaft due to the magnetic action of said motor and exceeding said predetermined frequency of said source of electric current, said rotor shaft comprising two separate rotatable members coupled together by said resilient power transmission means; a coupling bolt member for aligning said separate rotor members with respect to each other, said coupling bolt member being secured to one of said separate rotor members and freely rotatable within a bore of said other rotor member.

7. A drive arrangement as defined in claim 6 wherein said coupling bolt member is constructed of isolating material.

8. A drive arrangement as defined in claim 7 wherein said isolating material is fiberglass.

9. A drive arrangement comprising, in combination, a source of alternating current having a predetermined frequency; a commutator motor connected to said source of alternating current so as to be driven thereby; a rotatable rotor shaft forming part of said commutator motor and driven by the same; drive means; resilient power transmission means connected, on the one hand, to said rotatable rotor shaft and, on the other hand, to said drive means, and adapted to absorb mechanical vibrations of said rotatable rotor shaft due to the magnetic action of said motor and exceeding said predetermined frequency of said source of electric current, said rotor shaft comprising two separate rotatable members coupled together by said resilient power transmission means; a sleeve for supporting one end of one of said separate rotor members; a resilient sleeve interposed between said sleeve and the housing of said motor for supporting and securing said sleeve to said housing; commutator brushes associated with a commutator arranged on said rotor; and commutator brush supporting means secured to said sleeve for supporting said brushes.

10. A drive arrangement as defined in claim 9 wherein said resilient sleeve has the same resilient characteristics of said resilient power transmission means.

11. A drive arrangement as defined in claim 9 including spring means acting upon said brushes for maintaining said brushes in continuous contact with said commutator; and an isolating member interposed between said spring means and each of said brushes, said isolating means having the same resilient characteristics as said resilient power transmission means.

12. A drive arrangement comprising, in combination, a source of alternating current having a predetermined frequency; a commutator motor connected to said source of alternating current so as to be driven thereby; a rotatable rotor shaft forming part of said commutator motor and driven by the same; drive means; resilient power transmission means connected, on the one hand, to said rotatable rotor shaft and, on the other hand, to said drive means, and adapted to absorb mechanical vibrations of said rotatable rotor shaft due to the magnetic action of said motor and exceeding said predetermined frequency of said source of electric current, said mechanical vibrations of said rotatable rotor shaft exceeding twice the frequency of said source of alternating current.

13. A drive arrangement comprising, in combination, a source of alternating current having a predetermined frequency; a commutator motor connected to said source of alternating current so as to be driven thereby; a rotatable rotor shaft forming part of said commutator motor and driven by the same; drive means; resilient power transmission means connected, on the one hand, to said rotatable rotor shaft and, on the other hand, to said drive means, and adapted to absorb mechanical vibrations of said rotatable rotor shaft due to the magnetic action of said motor and exceeding said predetermined frequency of said source of electric current; and cooling means supported by said resilient power transmission means for cooling the interior of said motor.

14. The drive arrangement as defined in claim 4 including pin means secured to said flange and extending into said resilient power transmission means for securing said resilient power transmission means to said flange.

References Cited

UNITED STATES PATENTS

| 459,024 | 9/1891 | Short | 310—57 |
| 3,002,794 | 10/1957 | Bluemink | 310—51 |

FOREIGN PATENTS 93,771  8/1954  Norway.

WARREN E. RAY, Primary Examiner

R. SKUDY, Assistant Examiner

U.S. Cl. X.R.

310—50, 75, 83